United States Patent
Col

(10) Patent No.: US 7,100,024 B2
(45) Date of Patent: Aug. 29, 2006

(54) PIPELINED MICROPROCESSOR, APPARATUS, AND METHOD FOR GENERATING EARLY STATUS FLAGS

(75) Inventor: Gerard M. Col, Austin, TX (US)

(73) Assignee: VIA Technologies, Inc., (TW)

( * ) Notice: Subject to any disclaimer, the term of this patent is extended or adjusted under 35 U.S.C. 154(b) by 371 days.

(21) Appl. No.: 10/771,678

(22) Filed: Feb. 4, 2004

(65) Prior Publication Data

US 2004/0158696 A1  Aug. 12, 2004

Related U.S. Application Data

(60) Provisional application No. 60/445,071, filed on Feb. 4, 2003.

(51) Int. Cl.
*G06F 9/30* (2006.01)
*G06F 9/40* (2006.01)
*G06F 15/00* (2006.01)

(52) U.S. Cl. ............ 712/218; 712/216
(58) Field of Classification Search ........ 712/218, 712/216

See application file for complete search history.

(56) References Cited

U.S. PATENT DOCUMENTS

| | | | |
|---|---|---|---|
| 5,043,868 A | 8/1991 | Kitamura et al. | |
| 5,075,849 A | 12/1991 | Kuriyama et al. | |
| 5,442,767 A | 8/1995 | Eickemeyer et al. | |
| 5,487,153 A | 1/1996 | Hammerstrom et al. | |
| 5,493,669 A * | 2/1996 | Denman, Jr. | 711/133 |
| 5,687,349 A | 11/1997 | McGarity | |
| 5,701,426 A | 12/1997 | Ryan | |
| 5,768,610 A | 6/1998 | Pflum | |
| 5,812,813 A | 9/1998 | Henry et al. | |
| 5,867,724 A | 2/1999 | McMahon | |
| 6,021,471 A | 2/2000 | Stiles et al. | |
| 6,065,103 A | 5/2000 | Tran et al. | |
| 6,079,014 A | 6/2000 | Papworth et al. | |

(Continued)

FOREIGN PATENT DOCUMENTS

EP  0402787 A2  12/1990

OTHER PUBLICATIONS

IA-32 Intel Architecture Software Developer's Manual vol. 3: System Programming Guide, 2001.*

(Continued)

*Primary Examiner*—Fritz Fleming
*Assistant Examiner*—Jesse Moll
(74) *Attorney, Agent, or Firm*—Richard K. Huffman; E. Alan Davis; James W. Huffman

(57) ABSTRACT

An apparatus and method for generating early status flags in a pipeline microprocessor is disclosed. The apparatus includes early status flag generation logic that receives an instruction, an early result of the instruction, and a valid indicator of the early result and responsively generates the early flags. If the instruction is flag-modifying, then the early status flags are stored in an early flags register. The early flags in the register are invalidated if the early result from which they are generated is invalid. The early status flags and associated valid indicator may be employed by subsequent conditional instructions for early execution to avoid delay in waiting for the architected status flag values to be generated by execution units later in the pipeline. The early flags are revalidated if all flags-modifying instructions in pipeline stages below the early flag generation logic, if any, have already updated the architected status flags.

80 Claims, 8 Drawing Sheets

U.S. PATENT DOCUMENTS

| | | | |
|---|---|---|---|
| 6,085,292 | A | 7/2000 | McCormack et al. |
| 6,112,293 | A | 8/2000 | Witt |
| 6,148,391 | A | 11/2000 | Petrick |
| 6,209,076 | B1 | 3/2001 | Blomgren |
| 6,219,778 | B1 | 4/2001 | Panwar et al. |
| 6,343,359 | B1 | 1/2002 | Col et al. |
| 6,393,555 | B1 | 5/2002 | Meier et al. |
| 6,412,043 | B1 | 6/2002 | Chopra et al. |
| 6,421,771 | B1 | 7/2002 | Inoue |
| 2002/0049895 | A1 | 4/2002 | Inoue |

OTHER PUBLICATIONS

Jim Handy, The Cache Memory Book, Second Edition, Figure 2.4.

Liapasti et al, "Exceeding the Dataflow Limit via Value Prediction," Proceedings of the 29th Annual IFEE/ACM International, *Symposium on Microarchitecture*, pp. 226-2237.

Short, Kenneth L. *Embedded Microprocessor Systems Design: An Introduction Using the Intel 80C188EB*. 1998. Prentice Hall. Upper Saddle River, NJ, US. pp. 16, 182.

Jim Handy, The Cache Memory Book, 2nd Edition, 1998, pp. 47 and 222.

Farcy A et al: "Dataflow analysis of branck mispredictions and its application to early resolution of branch outcomes" Micro-31. Proceedings of the 31st. Annual ACM/IEEE International Symposium on Microarchitecture. Dallas, TX, Nov. 30-Dec. 2, 1998, Proceedings of the Annual ACM/IEEE International Symposium on Microarchitecture, Los Almitos, CA : IEEE Comp. Soc, US, Nov. 30, 1998, pp. 59-68, XP010318259 ISBN: 0-8186-8609-X * p. 64, paragraph 3-p. 66, paragraph 3.3*.

*IA-32 Intel Architecture Software Developer's Manual*. vol. 2: Instruction Set Reference. 2001, pp. 3-354 to 3-357.

* cited by examiner

Late Branch Correction

PIPELINED MICROPROCESSOR, APPARATUS, AND METHOD FOR GENERATING EARLY STATUS FLAGS

PRIORITY INFORMATION

This application claims priority based on U.S. Provisional Application Ser. No. 60/445,071, filed Feb. 4, 2003, entitled EARLY ACCUMULATION OF FLAGS.

FIELD OF THE INVENTION

This invention relates in general to the field of pipelined microprocessors, and particularly to early instruction execution therein.

BACKGROUND OF THE INVENTION

Modern microprocessors are pipelined microprocessors. That is, they operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. They go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Synchronous microprocessors operate according to clock cycles. Typically, an instruction passes from one stage of the microprocessor pipeline to another each clock cycle. In an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

A potential cause of pipeline bubbles is branch instructions. When a branch instruction is encountered, the processor must determine the target address of the branch instruction and begin fetching instructions at the target address rather than the next sequential address after the branch instruction. Furthermore, if the branch instruction is a conditional branch instruction (i.e., a branch that may be taken or not taken depending upon the presence or absence of a specified condition), the processor must decide whether the branch instruction will be taken, in addition to determining the target address. Because the pipeline stage that ultimately resolves the target address and/or branch outcome (i.e., whether the branch will be taken or not taken) is typically many stages below the stage that fetches the instructions, bubbles may be created.

To address this problem, modern microprocessors typically employ branch prediction mechanisms to predict the target address and branch outcome early in the pipeline. Microprocessor designers are continually striving to design branch predictors with greater prediction accuracy. However, branch predictors mispredict branch instruction outcomes a non-trivial percentage of the time. As alluded to above, the mispredictions must be detected and corrected in a subsequent stage of the pipeline below the branch prediction stage. The penalty associated with the misprediction is a function of the number of pipeline stages between the branch predictor and the branch misprediction correction stage. Therefore, what is needed is an apparatus and method for correcting conditional branch instruction mispredictions earlier in the pipeline.

Furthermore, conditional branch instructions specify a branch condition which, if satisfied, instructs the microprocessor to branch to the branch target address; otherwise, the microprocessor continues to fetch the next sequential instruction. The microprocessor includes status flags that store state of the microprocessor. The status flags are examined to determine whether the condition specified by the conditional branch instruction is satisfied. Thus, in order to finally determine whether a conditional branch instruction has been mispredicted, the microprocessor must examine the most current state of the status flags. However, currently, it is not until late in the pipeline that the status flags are examined in order to determine whether the branch condition is satisfied and whether the branch prediction was incorrect. Therefore, what is needed is an apparatus and method for generating the status flags earlier in the pipeline.

Finally, the state of the status flags is typically affected by the results of instructions preceding the conditional branch instruction. For example, the condition may be whether the carry flag, which is one of the status flags, is set. The state of the carry flag may be determined by the most recent add instruction result, for example. However, the results of instructions that affect the status flags are currently generated in execution units located in lower pipeline stages of the microprocessor. Therefore, what is needed is an apparatus and method for generating instruction results earlier in the pipeline.

SUMMARY

In one aspect, the present invention provides an apparatus and method for generating early status flags in a pipeline microprocessor. The apparatus includes early status flag generation logic that receives an instruction, an early result of the instruction, and a valid indicator indicating whether the early result is valid. In response, the early flag generation logic generates the early status flags. If the instruction is a status flag-modifying instruction, then the early status flags are stored in an early flags register. The early status flags register is invalidated if the early result from which the early flags are generated is invalid. The early status flags and associated valid indicator may be employed by subsequent conditional instructions for early execution to avoid delay in waiting for the architected status flag values to be generated by execution units later in the pipeline. The early status flags are updated (by copying the architected status flags thereto) and revalidated if all flags-modifying instructions in pipeline stages below the early flag generation logic, if any, have already updated the architected status flags. In another embodiment, the early status flags are updated (by copying the architected status flags thereto) and revalidated if the microprocessor pipeline is flushed.

The early status flags may be used to perform early correction of a conditional branch instruction in a pipeline microprocessor. A branch predictor predicts the outcome of the conditional branch instruction early in the pipeline. The prediction is piped down the pipeline along with the branch instruction. Early branch correction logic is located in a pipeline stage above a stage in which late branch correction logic is located. When the branch instruction reaches the early branch correction logic, the early branch correction logic examines the condition code specified by the branch instruction and determines whether the specified condition is satisfied in the early status flags in order to determine whether the prediction is incorrect. The early status flags are generated in response to instructions preceding the branch instruction. If the early status flags are valid and indicate a misprediction, the early branch correction logic corrects the misprediction.

In another aspect, the early results of the instructions preceding the conditional branch instruction are generated by early execution logic. The early execution logic is located in a pipeline stage above the stage in which execution units that generate final instruction results and final status flag values are located. The early execution logic is configured to execute a subset of the instructions of the microprocessor instruction set. In particular, the early execution logic is included in an address stage of the pipeline and comprises an address generator enhanced to perform frequently executed instructions that may be performed quickly. In one embodiment, the early execution logic includes logic for performing common, fast arithmetic, Boolean, and shift operations. If the early results generated by the early execution logic are results of a preceding instruction for which the early execution logic is not configured to generate a valid result, then the early results are invalid, and if the instruction is a status-flag modifying instruction, the early status flags are invalidated.

In another aspect, the early results are stored in an early register file, whose registers correspond to the architected register file of the microprocessor, along with valid indicators for each register in the early register file. The early register file provides early results as operands to the early execution logic/address generator for use in generating the early results. If the early register file provides an invalid input operand to the early execution logic, then the early result generated is invalid, and if the instruction is a status-flag modifying instruction, the early status flags are invalidated.

DETAILED DESCRIPTION

Figure 1:
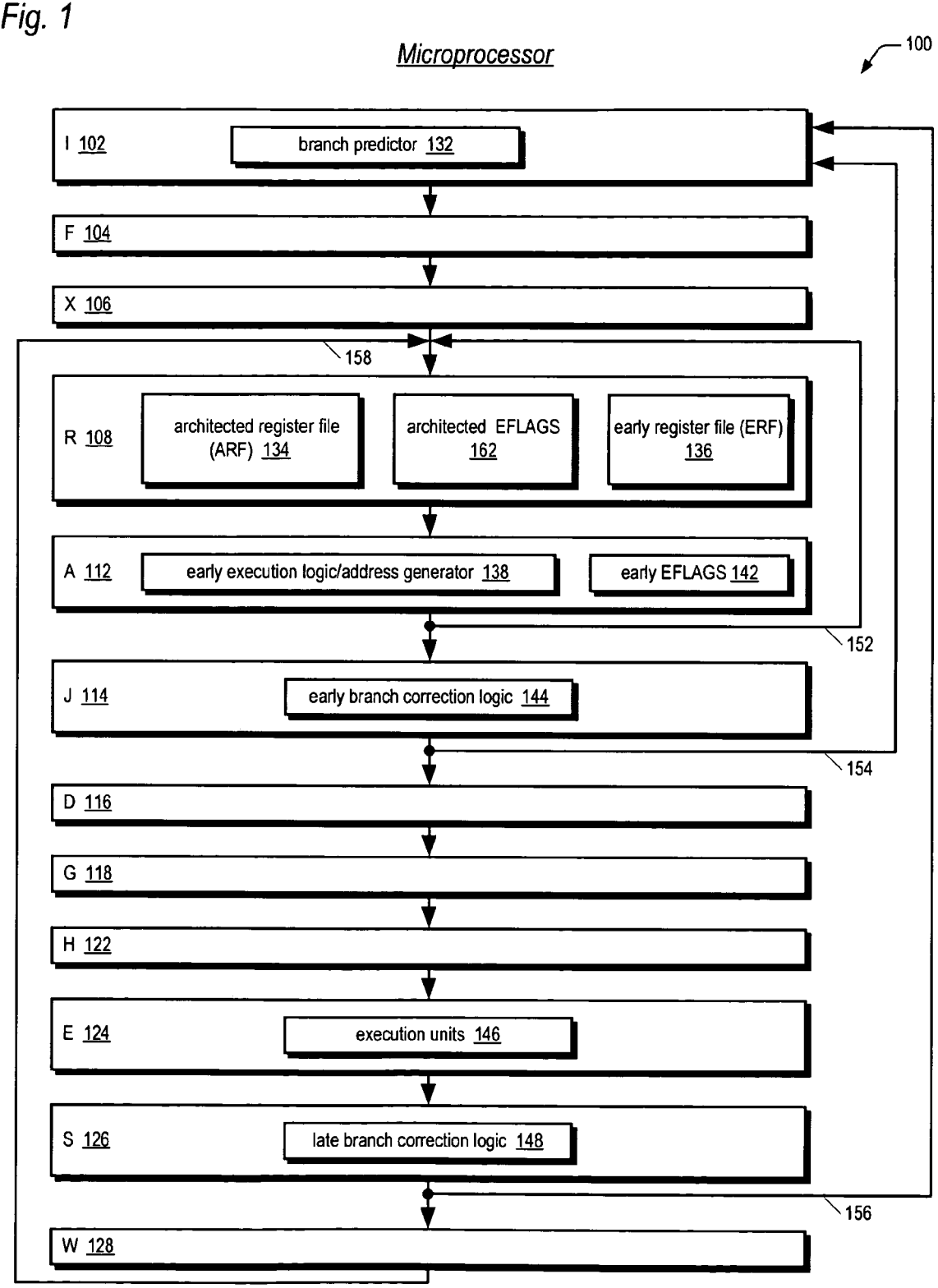
FIG. 1 is a block diagram of a pipeline microprocessor according to the present invention.

Referring now to FIG. 1, a block diagram of a pipeline microprocessor 100 according to the present invention is shown. The microprocessor 100 includes a plurality of stages in its pipeline. FIG. 1 illustrates twelve pipeline stages.

The microprocessor 100 includes an I-stage 102 (instruction fetch stage) for fetching instructions. The I-stage 102 includes an instruction cache for caching program instructions. The I-stage 102 fetches program instructions from the instruction cache or from a system memory coupled to the microprocessor 100. The I-stage 102 fetches instructions at a memory address stored in an instruction pointer register. Normally the instruction pointer is incremented as instructions are fetched such that instructions are fetched sequentially. However, the instruction pointer value may be changed to a non-sequential memory address in response to a branch instruction in order to cause the microprocessor 100 to branch to a branch target address. The I-stage 102 also includes a branch predictor 132. The branch predictor 132 makes a prediction of whether a branch instruction is present in the fetched instruction stream, whether the branch instruction will be taken or not taken, and what is the branch target address of the branch instruction if it is taken. That is, the branch predictor 132 predicts whether the branch instruction, when finally resolved later in the pipeline 100, will instruct the microprocessor 100 to branch to a branch target address specified by the branch instruction (taken) or will instruct the microprocessor 100 to fetch and execute the next sequential instruction following the branch instruction (not taken). The I-stage 102 receives first and second control inputs 154 and 156, described in more detail below, for instructing the I-stage 102 to correct a prediction of a branch instruction made by the branch predictor 132. In one embodiment, the branch predictor 132 comprises a branch target address cache (BTAC) that caches the addresses of previously executed branch instructions and their resolved branch target address. Additionally, the BTAC stores prediction information used in predicting whether the branch instruction will be taken or not taken based on prior history of the branch instruction. Other embodiments include dynamic branch history tables, static branch predictors, and hybrid static/dynamic branch predictors, such as are well known in the art of branch prediction. In one embodiment, the I-stage 102 comprises four pipeline stages.

The microprocessor 100 also includes an F-stage 104 (instruction format stage), coupled to the I-stage 102. In one embodiment, the instruction set of the microprocessor 100 includes variable length instructions, such as the x86 architecture instruction set, rather than fixed-length instructions. The F-stage 104 includes an instruction formatter for parsing a stream of instruction bytes and separating the stream into distinct instructions. In particular, the instruction formatter determines the length and starting location of each instruction within the stream of instruction bytes. In one embodiment, the F-stage 104 includes an instruction queue for storing formatted instructions.

The microprocessor 100 also includes an X-stage 106 (translation stage), coupled to the F-stage 104. In one embodiment, the microprocessor 100 includes a reduced instruction set computer (RISC) core. The RISC core executes a native instruction set. The native instructions, also referred to as microinstructions, are instructions that are relatively less complex and more efficiently executed than the program instructions fetched by the I-stage 102, which are referred to as macroinstructions. For example, the x86 architecture instruction set comprises macroinstructions, or complex instruction set computer (CISC) instructions. The X-stage 106 includes an instruction translator for translating macroinstructions into microinstructions. The instruction translator retrieves formatted macroinstructions from the F-stage 104 macroinstruction queue and translates each of the macroinstructions into one or more microinstructions for provision to the remaining stages of the pipeline 100, which are referred to generally and collectively as the execution stages of the pipeline 100. In one embodiment, the X-stage 106 includes a microinstruction queue for storing translated microinstructions. In one embodiment, X-stage 106 comprises two pipeline stages.

Figure 3:
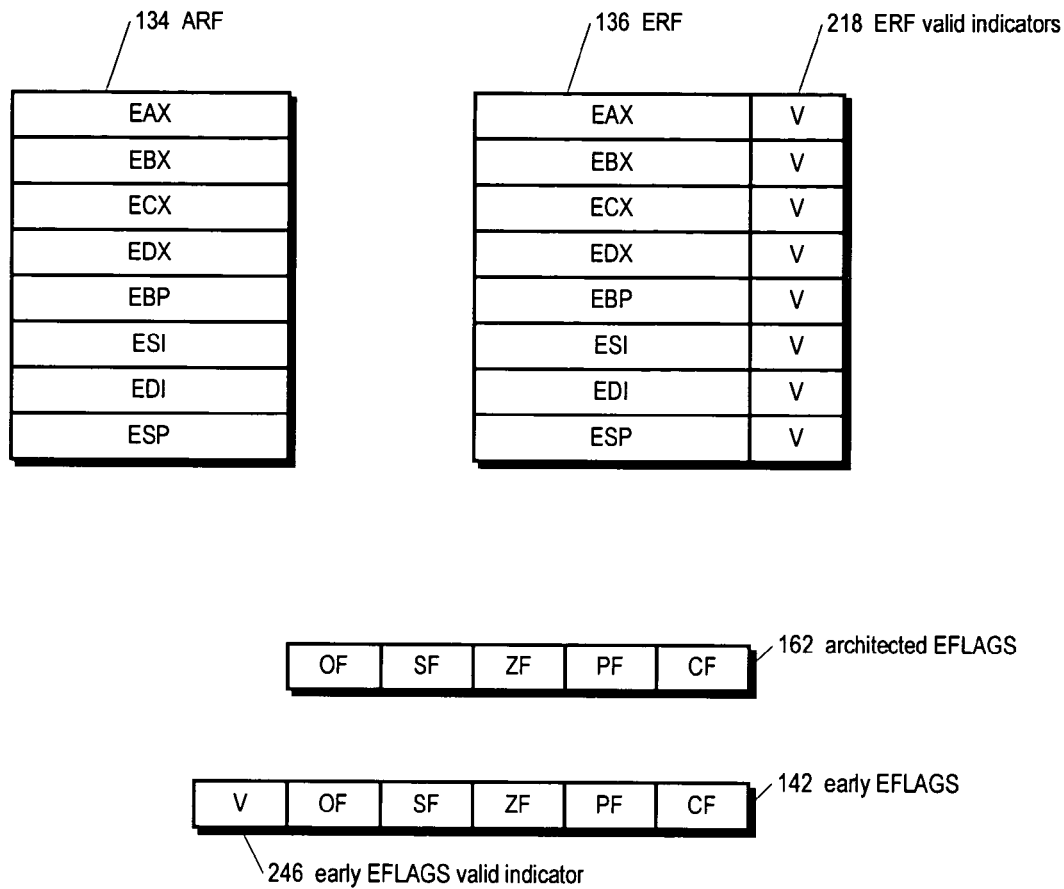
FIG. 3 is a block diagram illustrating the architected register file, early register file, architected EFLAGS register, and early EFLAGS register of FIGS. 1 and 2 according to the present invention.

The microprocessor 100 also includes an R-stage 108 (register stage), coupled to the X-stage 106, and an A-stage 112 (address generation stage), coupled to the R-stage 108. The R-stage 108 includes an architected register file (ARF) 134 and an early register file (ERF) 136. The architected register file 134 includes registers that are visible to programs executing on the microprocessor 100. In particular, a program instruction may specify a register in the architected register file 134 as a source operand from which to receive an input for the instruction to operate upon to generate a result; similarly, the program instruction may specify a register in the architected register file 134 as a destination operand to which the result of the instruction is to be written. The instruction may specify the register explicitly or implicitly. In one embodiment, the architected register file 134 includes EAX, EBX, ECX, EDX, EBP, ESI, EDI, and ESP registers of the x86 architecture register file, as shown in FIG. 3. The early register file 136 includes registers corresponding to each of the registers in the architected register file 134, as shown in FIG. 3.

The values stored in the architected register file 134 registers reflect the user-visible state of the microprocessor 100, whereas the values stored in the early register file 136 registers may reflect a speculative state of the microprocessor 100. That is, when a stage of the microprocessor 100 generates an instruction result and the instruction specifies an architected register file 134 register as the result destination, the result is not allowed to be written to the architected register file 134 until the instruction is no longer speculative, i.e., until the instruction is guaranteed to complete, or retire. In contrast, as described in detail below, an instruction result may be written to the early register file 136 before the instruction is guaranteed to complete. In particular, an instruction result generated by an early execution logic/address generator 138 (included in A-stage 112 and described in detail below) may be written to the early register file 136 before the instruction is guaranteed to complete. An instruction is guaranteed to complete if the microprocessor 100 determines that the instruction itself and no instructions preceding the instruction are still capable of generating an exception, and all branch instructions preceding the instruction are finally resolved, i.e., the microprocessor 100 finally determines that each branch instruction preceding the instruction has been correctly either taken or not taken and that the branch target address of each taken branch instruction is correct. Additionally, the architected register file 134 values are always guaranteed to be valid, whereas the early register file 136 values in addition to being speculative, may or may not be valid, as discussed in detail below. Consequently, each of the registers in the early register file 136 also includes a corresponding valid bit 218, as shown in FIG. 3, for indicating whether the value stored in the corresponding register is valid. The early register file 136 is initialized to the same values with which the architected register file 134 is initialized when the microprocessor 100 is reset.

The R-stage 108 of the microprocessor 100 pipeline also includes an architected EFLAGS register 162 and the A-stage 112 includes an early EFLAGS register 142. The architected EFLAGS register 162 and early EFLAGS register 142 store status flags that indicate attributes of the results of instructions, such as whether the result is zero, generated a carry, or is negative. In one embodiment, each status flag comprises a single bit. In one embodiment, architected EFLAGS register 162 comprises an x86 architecture EFLAGS register including the following status flags: overflow flag (OF), sign flag (SF), zero flag (ZF), parity flag (PF), and carry flag (CF), as shown in FIG. 3. Microprocessor 100 includes in its instruction set conditional instructions that specify condition codes. A condition code specifies a state of one or more of the status flags. If the current state of the status flags is equal to the state specified in the condition code, then the condition is true and the microprocessor 100 performs an operation specified by the conditional instruction; otherwise, the specified operation is not performed. An example of a conditional instruction is a conditional branch instruction, which in the x86 architecture is a jump if condition is met instruction (Jcc), which specifies a condition code and a displacement used to calculate a branch target address. A specific example of a Jcc is a JNZ (jump if not zero) instruction. The JNZ instruction specifies a "not zero" condition code. If the zero flag (ZF) is clear (i.e., the "not zero" condition is true), then the microprocessor 100 branches to the branch target address specified by the branch instruction (i.e., the conditional branch instruction is taken); however, if the zero flag is set (i.e., the "not zero" condition is false), then the microprocessor 100 fetches the next sequential instruction after the conditional branch instruction (i.e., the conditional branch instruction is not taken). Other examples of conditional x86 instructions are the SETcc, LOOPcc, and CMOVcc instructions.

The architected EFLAGS register 162 includes status flags that are visible to programs executing on the microprocessor 100. In particular, a conditional program instruction may specify a condition code based on the status flags in the architected EFLAGS register 162. The early EFLAGS register 142 includes status flags corresponding to each of the status flags in the architected EFLAGS register 162, as shown in FIG. 3. Similar to the relationship between the architected register file 134 and the early register file 136, the values stored in the architected EFLAGS register 162 reflect the user-visible state of microprocessor 100, whereas the values stored in the early EFLAGS register 142 may reflect a speculative state of the microprocessor 100. That is, when a stage of the microprocessor 100 executes an instruction that modifies one or more status flags, the status flags are not updated in the architected EFLAGS register 162 until the instruction is no longer speculative. In contrast, as described in detail below, the status flags may be updated in the early EFLAGS register 142 before the instruction is guaranteed to complete. In particular, the microprocessor 100 may update a status flag in the early EFLAGS register 142 in response to an instruction executed by the early execution logic/address generator 138, also referred to as early execution unit 138, before the instruction is guaranteed to complete. Additionally, the architected EFLAGS register 162 values are always guaranteed to be valid, whereas the early EFLAGS register 142 values may or may not be valid, as discussed in detail below. Consequently, the early EFLAGS register 142 also includes a valid bit 246, as shown in FIG. 3, for indicating whether the values stored in the early EFLAGS register 142 are valid. The early EFLAGS register 142 is initialized to the same values with which the architected EFLAGS register 162 is initialized when the microprocessor 100 is reset. The embodiment of FIG. 3 shows a single valid bit 246 for the early EFLAGS 142. However, another embodiment is contemplated in which a valid bit is maintained for each status flag in the early EFLAGS 142.

The A-stage 112 early execution logic/address generator 138 generates an early result and valid indicator that are provided back to the R-stage 108 via an early result bus 152, as described in more detail below. The early execution logic/address generator 138 also performs effective address calculations to generate memory addresses for memory accesses based on input operands, such as operands provided by architected register file 134, early register file 136, and/or a constant operand provided by the instruction, such as a displacement, or offset. The memory addresses may be implicitly specified by the instruction. The memory addresses may also be implicitly specified by the instruction, such as an address of a location in a stack memory based on an implicitly specified stack pointer register (e.g., ESP) or block pointer register (e.g., EBP), such as in a push or pop instruction.

The microprocessor 100 also includes a J-stage 114, coupled to the A-stage 112. The J-stage 114 includes early branch correction logic 144. The early branch correction logic 144 selectively corrects branch predictions based on the early EFLAGS register 142 values via control signal 154, as described in detail below.

The microprocessor 100 also includes a D-stage 116 coupled to J-stage 114, a G-stage 118 coupled to D-stage 116, and an H-stage 122 coupled to G-stage 118. The D-stage 116, G-stage 118, and H-stage 122 include a data cache for caching data from the system memory. In one embodiment, the data cache is a pipelined cache comprising three pipeline stages and requiring a three clock cycle access time. The data cache is accessed using memory addresses generated by the early execution logic/address generator 138. Instructions that perform load operations of data from memory are performed in the D-stage 116, G-stage 118, and H-stage 122.

The microprocessor 100 also includes an E-stage 124 (execution stage), coupled to H-stage 122. The E-stage 124 includes execution units 146 that execute instruction operations. The execution units 146 may include circuitry such as adders, subtractors, multipliers, dividers, shifters, rotators, logic for performing Boolean operations, logic for performing transcendental and logarithmic functions, and so forth, for generating final results of instructions. In one embodiment, the execution units 146 include an integer unit, a floating-point unit, an MMX unit, and an SSE unit. The instruction results generated by the execution units 146 are always correct instruction results. The execution units 146 receive input, or source, operands that are always valid. The execution units 146 input operand sources include the architected register file 134, the architected EFLAGS register 162, operands from the data cache, immediate or constant operands specified explicitly in instructions, and operands forwarded from other pipeline stages. In particular, the execution units 146 do not receive speculative input operands from the early register file 136 or the early EFLAGS register 142.

The microprocessor 100 also includes an S-stage 126 (store stage), coupled to the E-stage 124. The S-stage 126 performs store operations to store data, such as instruction results generated by the execution units 146, to the data cache and/or system memory. Additionally, the S-stage 126 includes late branch correction logic 148 that corrects branch predictions based on the architected EFLAGS register 162 values via control signal 156, as described in detail below.

The microprocessor 100 also includes a W-stage 128 (result write-back stage), coupled to the S-stage 126. The W-stage 128 updates the architected state of the microprocessor 100 by writing instruction results back to the architected register file 134 and to the architected EFLAGS register 162 via a result bus 158.

In one embodiment, the microprocessor 100 comprises a single instruction issue, or scalar, or single execution, microprocessor. That is, at most one instruction is issued each clock cycle of the microprocessor 100 from the instruction issuing, or instruction generation, stages (I-stage 102 through X-stage 106) to the instruction execution stages (R-stage 108 through W-stage 128), in contrast to superscalar microprocessors, which issue two or more instructions for execution per clock cycle. However, the method and apparatus described herein are not limited to a scalar microprocessor unless so stated. In one embodiment, microprocessor 100 comprises an in-order issue microprocessor. That is, instructions are issued for execution in the order they are specified in the program, unlike some microprocessors which have the capability to issue instructions out-of-order.

Figure 2:
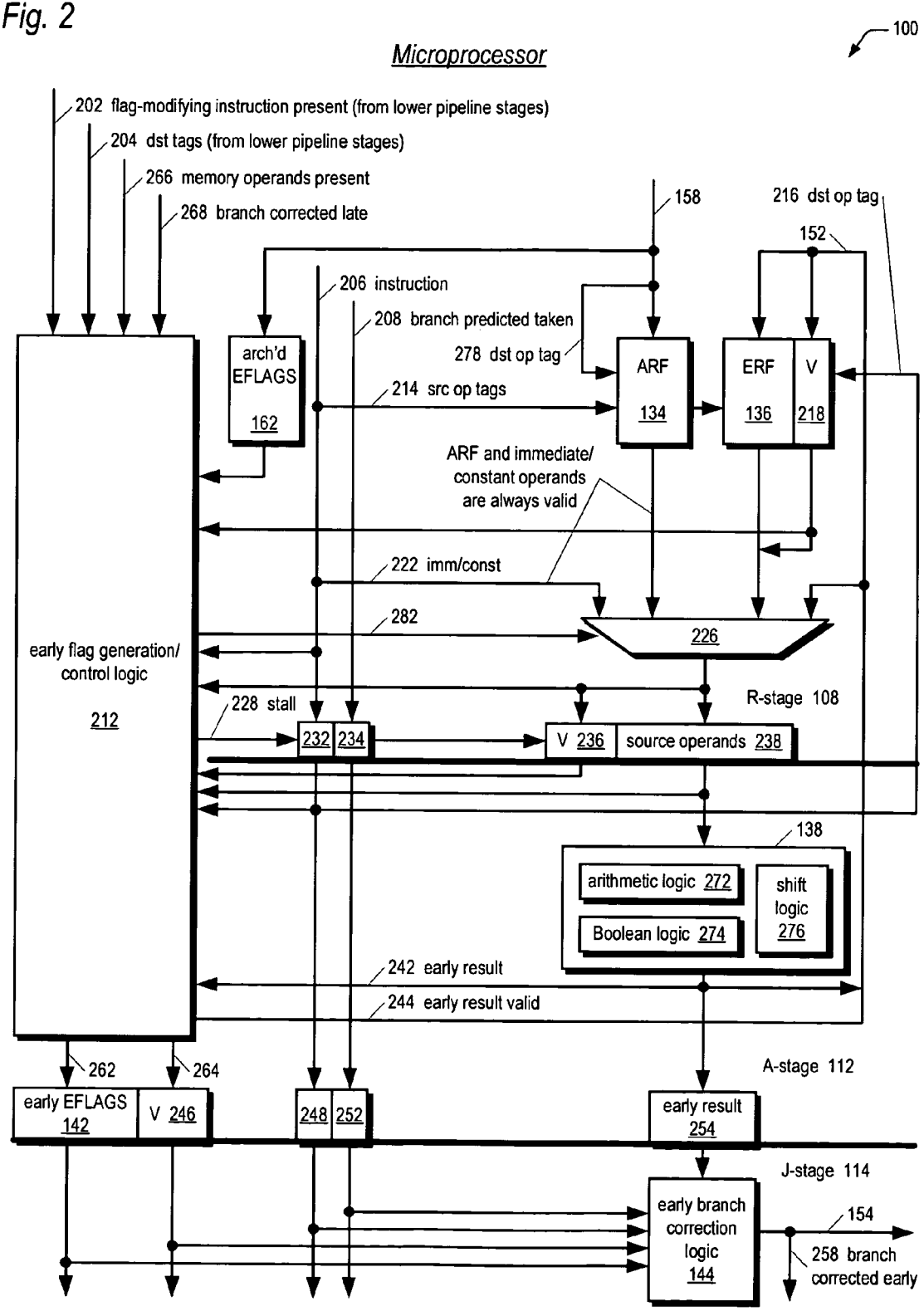
FIG. 2 is a block diagram illustrating in detail the R-stage, A-stage, and J-stage of the microprocessor of FIG. 1 according to the present invention.

Referring now to FIG. 2, a block diagram illustrating in detail the R-stage 108, A-stage 112, and J-stage 114 of the microprocessor 100 of FIG. 1 according to the present invention is shown. The R-stage 108 includes the architected register file 134, early register file 136, and architected EFLAGS register 162 of FIG. 1. The architected EFLAGS register 162 is updated from the W-stage 128 via result bus 158. The R-stage 108 receives an instruction 206 from the X-stage 106. The instruction 206 may include decoded information about the instruction in addition to the instruction bytes themselves. The instruction specifies the type of the instruction, such as an add, branch, etc. The instruction may also specify a condition code. The instruction also may specify a destination operand location via a tag. In particular, the destination operand tag may specify one of the registers in the architected register file 134 as a destination of the instruction 206 result. The architected register file 134 receives instruction results from the W-stage 128 via result bus 158 of FIG. 1. A destination operand tag 278 is provided as a selector input to the architected register file 134 via result bus 158 for selecting which of the registers will be updated with the instruction results from the result bus 158. The early register file 136 receives an early result 242 from the A-stage 112 via early result bus 152 of FIG. 1. The instruction 106 includes a destination operand tag 216 that is provided as a selector input to the early register file 136 for selecting which of the registers will be updated with the early result 242. The destination operand tag 216 provided to the early register file 136 is provided from a pipeline register 232 that stages down the instruction 206 to the A-stage 112.

The instruction also may specify one or more source operands via source operand tags signal 214. In one embodiment, the instruction 206 may specify up to three source operands. The instruction 206 specifies register source operands via the source operand tags signal 214. The source operand tags 214 are provided as a selector input to the architected register file 134 and the early register file 136 for selecting which, if any, of the registers will be provided as source operands to the instruction 206. The instruction may also specify an immediate or constant (such as a displacement or offset) operands 222.

The R-stage 108 also includes valid bits 218 for each of the early register file 136 registers, also shown in FIG. 3. The early register file valid bits 218 receive an early result valid indicator 244 from the A-stage 112 via early result bus 152. The early result valid indicator 244 is used to update the valid bit 218 corresponding to the early register file 136 register selected by the destination operand tag 216.

The R-stage 108 also includes a multiplexer 226 that selects source operands for the instruction 206 entering the R-stage 108. The multiplexer 226 receives source operand inputs from the architected register file 134 and the early register file 136. In one embodiment, the architected register file 134 comprises three read ports, two of whose outputs are provided as inputs to the multiplexer 226 for providing up to two source operands per clock cycle. In one embodiment, the early register file 136 comprises two read ports whose outputs are provided as inputs to the multiplexer 226 for providing up to two source operands per clock cycle. The multiplexer 226 also receives an immediate/constant operand 222 that may be included in the instruction 206. The multiplexer 226 also receives the early result 242 from the A-stage 112.

Additionally, the multiplexer 226 receives a valid bit input associated with each operand input. The valid bits associated with the operands received from the early register file 136 are provided from the early register file valid bits 218. The valid bit associated with the early result 242 operand received from the A-stage 112 is the early result valid indicator 244. The valid bits for the operands provided by the architected register file 134 and the immediate/constant 222 operand are always true, i.e., the architected register file 134 and immediate/constant 222 operands are always valid. The source operands and corresponding valid bits selected by the multiplexer 226 are provided to a source operands pipeline register 238 and a valid bit pipeline register 236, respectively, for provision to the A-stage 112. In one embodiment, the source operands register 238 is configured to store up to three source operands and the valid bit register 236 is configured to store up to three corresponding valid bits.

In one embodiment, the microprocessor 100 also includes forwarding buses (not shown) that forward results generated by the execution units 146 from the E-stage 124 and the S-stage 126 to the R-stage 108 for operand provision. The forwarding buses are provided as inputs to the multiplexer 226. If the R-stage 108 instruction specifies a source operand whose tag does not match a destination tag in stages A 112 through H 122, but does match a destination tag in stages E 124 or S 126, then early flag generation/control logic 212 controls multiplexer 226 to select the forwarding bus supplying the newest result as the operand. If an operand is provided on the forwarding buses, it is always valid.

The microprocessor 100 also includes early flag generation/control logic 212. The early flag generation/control logic 212 receives as input the architected EFLAGS 162. The early flag generation/control logic 212 also receives as input the instruction 206 in the R-stage 108 and in the A-stage 112. The early flag generation/control logic 212 also receives as input the output of the multiplexer 226 i.e., the R-stage 108 source operands and associated valid bits. The early flag generation/control logic 212 also receives as input the outputs of pipeline registers 232, 236 and 238, i.e., the A-stage 112 instruction, its source operands, and associated valid bits. The early flag generation/control logic 212 also receives as input the early result 242. The early flag generation/control logic 212 also receives as input a flag-modifying instruction present signal 202 from each of the pipeline stages below the A-stage 112. A true value on a flag-modifying instruction present signal 202 indicates that the corresponding stage has an instruction that modifies the architected EFLAGS register 162 and that the architected EFLAGS register 162 has not yet been updated by the instruction. The flag-modifying instruction present signals 202 are used to determine when the early EFLAGS register 142 may be restored and validated, as described below with respect to FIG. 5. The early flag generation/control logic 212 also receives as input a branch corrected late signal 268. A true value on the branch corrected late signal 268 indicates that the late branch correction logic 148 of FIG. 1 corrected a branch misprediction, which implies that the pipeline 100 was flushed. The branch corrected late signal 268 is also used to determine when the early EFLAGS register 142 may be restored and validated, as described below with respect to FIG. 5. The early flag generation/control logic 212 also receives as input destination tags 204 of the instructions present in each of the pipeline stages below the A-stage 112. The destination tags 204 are used to determine whether a source operand specified by an instruction 206 in the R-stage 108 should be provided from the architected register file 134, the early register file 136 or the A-stage 112 early result 242, as described below with respect to FIG. 4. In one embodiment, the instruction 206 may specify a memory source operand, i.e., an operand whose location is specified by a memory address. Typically, the memory operand is present in system memory, or in the data cache, although in one embodiment, the memory operand may be present in a lower stage of the microprocessor 100 pipeline, such as may be the case with data that is the subject of a previous store instruction having a destination memory address that matches the R-stage 108 instruction memory operand address. Although not shown, the multiplexer 226 also receives memory operands as inputs. The early flag generation/control logic 212 also receives as input a memory operands present signal 266 that indicates whether memory source operands specified by the instruction are present and available for provision to the multiplexer 226. The memory operands present signal 266 is used to determine whether it is necessary to stall the R-stage 108 instruction 206 and whether the early result 242 is valid, as described below with respect to FIG. 4.

In response to its inputs, the early flag generation/control logic 212 generates various control signals. The early flag generation/control logic 212 generates a selector control signal 282 that controls the multiplexer 226 to select the appropriate source operands for the instruction 206. The early flag generation/control logic 212 also generates the early result valid signal 244. The early flag generation/control logic 212 also generates an early EFLAGS 262 value for storage in early EFLAGS register 142 and a control signal 264 for updating the value in the early EFLAGS valid register 246. The value in the early EFLAGS valid register 246 is initialized to a valid value when the microprocessor is reset. The early EFLAGS register 142 register and valid register 246 operate as pipeline registers for providing the early EFLAGS and valid bit to the J-stage 114. The early flag generation/control logic 212 also generates a stall signal 228, which is provided to pipeline registers 232, 234, 236, and 238, for stalling the R-stage 108. In one embodiment, pipeline registers 232, 234, 236, and 238 comprise muxedregisters configured to retain their current state when the stall signal 228 is true, until the next clock cycle. Operation of the stall signal 228 is described below with respect to FIG. 4.

The A-stage 112 includes the early execution logic/address generator 138, which receives the source operands from the source operands register 238 and generates the early result 242 in response to the source operands 238. The early execution logic/address generator 138 includes arithmetic logic 272, Boolean logic 274, and shift logic 276. The early execution logic/address generator 138 is configured to generate effective addresses for memory operations. The early execution logic/address generator 138 is also configured to perform a subset of the operations required by the instructions of the instruction set of the microprocessor 100. Accordingly, the early execution logic/address generator 138 is configured to perform a subset of the operations performable by the execution units 146 of FIG. 1. The early execution logic/address generator 138 is configured to perform a subset of operations that are the most commonly executed operations. Advantageously, in one embodiment, the most commonly executed operations also substantially coincide with operations that are the fastest to perform (i.e., require a relatively short amount of time to perform such that they can be performed in a single clock cycle) and require a relatively small amount of hardware, particularly beyond the hardware already required to generate memory addresses. In one embodiment, the arithmetic logic 272 is configured to perform an add, subtract, increment, and decrement; however, the arithmetic logic 272 is not configured to perform an add with carry or subtract with borrow, for example. In one embodiment, the Boolean logic 274 is configured to perform a Boolean AND, OR, XOR, NOR, move with sign extend and move with zero extend; however, the Boolean logic 274 is not configured to perform a byte swap, for example. In one embodiment, the shift logic 276 is configured to perform a shift left or shift right; however, the shift logic 276 is not configured to perform rotate or rotate through carry operations, for example. Although specific embodiments are described in which the early execution logic/address generator 138 performs specific subsets of operations, the present invention is not limited to particular embodiments, and one skilled in the art of microprocessor design may readily appreciate that the early execution logic/address generator 138 may be configured to perform a specific subset of operations based on the particular instruction set of the microprocessor 100 as well as target performance and circuit real estate goals. The early result 242 generated by the early execution logic/address generator 138 is provided to an early result pipeline register 254 for storage and subsequent provision to the J-stage 114.

The J-stage 114 includes early branch correction logic 144 of FIG. 1. The early branch correction logic 144 receives the output of the early EFLAGS register 142, the early EFLAGS valid register 246, and the early result register 254. The early branch correction logic 144 also receives the instruction in the J-stage 114 from a pipeline register 248 used to pipe down the instruction 206 from pipeline register 232. The microprocessor 100 also includes a branch predicted taken signal 208 that is piped down from the I-stage 102, F-stage 104, and X-stage 106 through pipeline registers 234 in the R-stage 108 and 252 in the A-stage 112 and provided to early branch correction logic 144. A true value on the branch predicted taken signal 208 indicates that the instruction in the corresponding stage is a branch instruction that was predicted taken by the branch predictor 132 of FIG. 1, i.e., that the microprocessor 100 branched previously in response to the prediction made by the branch predictor 132.

In response to its inputs, the early branch correction logic 144 generates the branch control signal 154 that is provided to the I-stage 102 of FIG. 1. The branch control signal 154 includes a branch corrected early signal 258 that is provided to late branch correction logic 148 of FIG. 1. The branch corrected early signal 258 is true if the early branch correction logic 144 corrects a branch prediction, as described below with respect to FIG. 6. Operation of the early branch correction logic 144 is described in detail below with respect to FIG. 6.

Figure 4A:
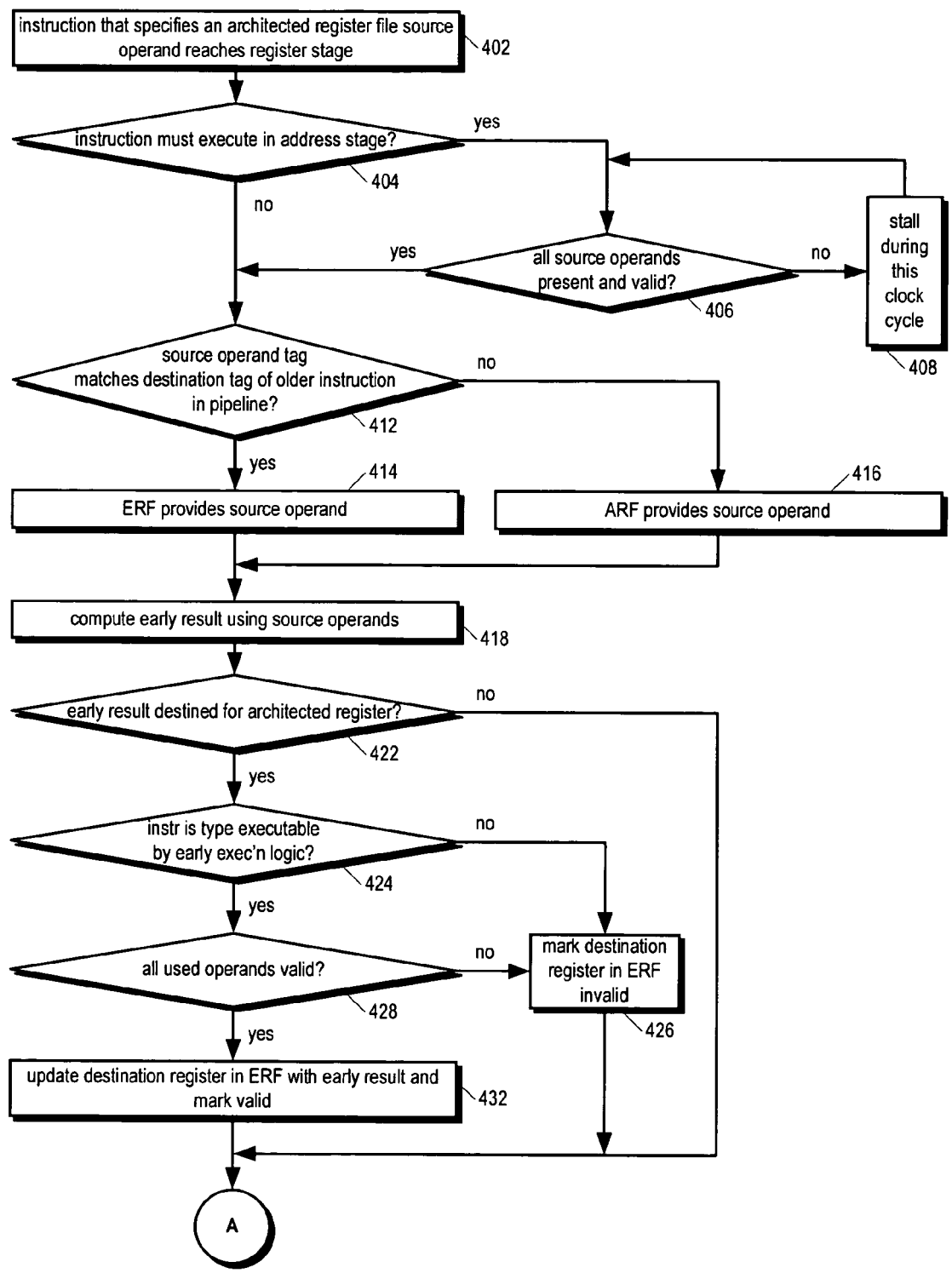
FIG. 4 is a flowchart illustrating operation of the apparatus of FIG. 2 to generate early results and early EFLAGS according to the present invention.
Figure 4B:
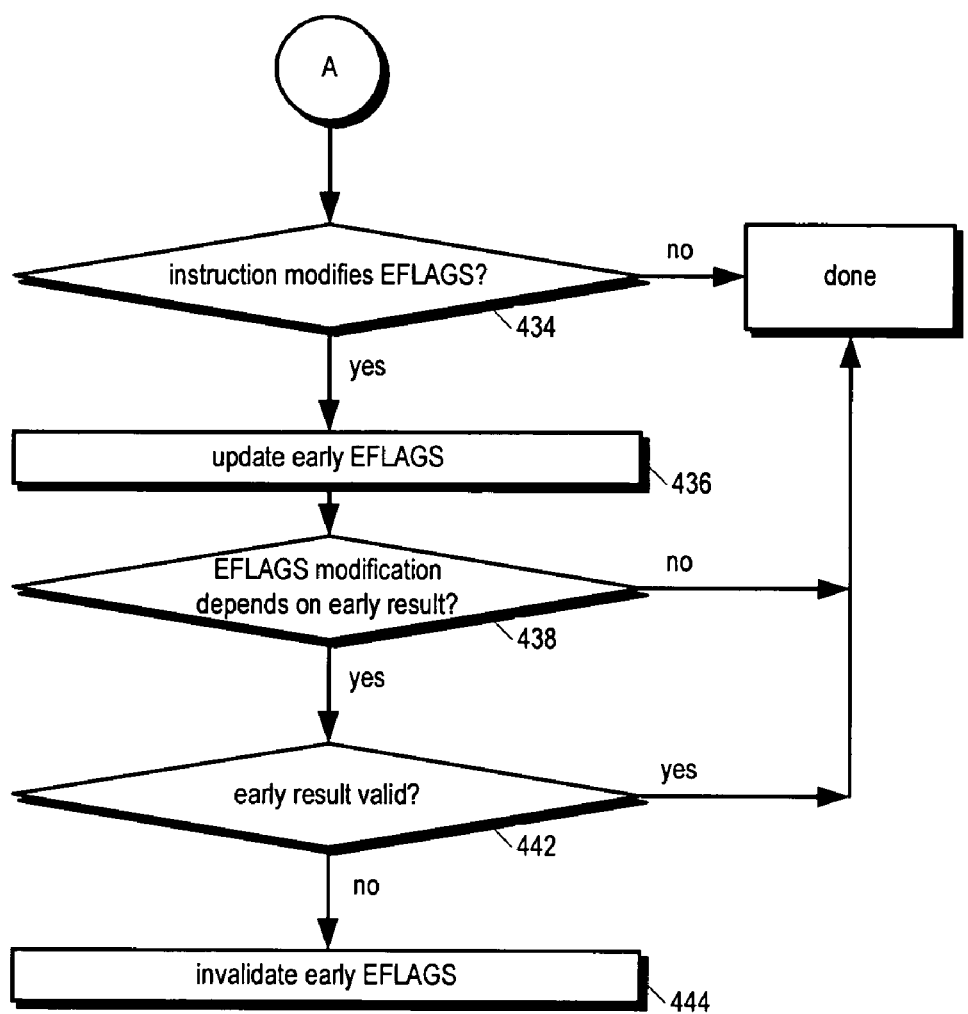

Referring now to FIG. 4, a flowchart illustrating operation of the apparatus of FIG. 2 to generate early results and early EFLAGS according to the present invention is shown. The flowchart of FIG. 4 spans two drawing pages, denoted FIG. 4A and FIG. 4B. Flow begins at block 402.

At block 402, an instruction 206 that specifies a source operand from the architected register file 134 reaches the R-stage 108. The instruction specifies the one or more source register operands via source operand tags signal 214. Flow proceeds to block decision 404.

At decision block 404, early flag generation/control logic 212 examines the instruction type and determines whether the instruction is of a type that must execute in the A-stage 112. In one embodiment, the instruction must execute in the A-stage 112 if the instruction requires the generation of a memory address that must be provided to the data cache in the D-stage 116. If the instruction must execute in the A-stage 112, then flow proceeds to decision block 406; otherwise, flow proceeds to decision block 412.

At decision block 406, early flag generation/control logic 212 determines whether all source operands specified by the instruction are present and valid. If the instruction specifies a memory operand, the early flag generation/control logic 212 examines the memory operands present signal 266 to determine whether the specified memory operand is present and valid. If the instruction specifies an immediate operand, the immediate operand is always present and valid. If the instruction specifies a register operand, early flag generation/control logic 212 compares the destination tags 204 from the lower pipeline stages with the source operand tag 214 to determine whether an older instruction in the pipeline 100 generated a result that is destined for the architected register file 134 register specified by the source operand tag 214. If so, the result is present in the early register file 136, in which case the early flag generation/control logic 212 examines the valid bit 218 for the specified operand to determine whether the operand is valid. If an older instruction in the pipeline 100 has not generated a result that is destined for the architected register file 134 register specified by the source operand tag 214, then the operand is present and valid because it will be supplied from the architected register file 134. If all source operands specified by the instruction are present and valid, flow proceeds to decision block 412; otherwise flow proceeds to block 408.

At block 408, early flag generation/control logic 212 generates a true value on the stall signal 228 to stall the instruction in the R-stage 108 during the current clock cycle waiting for the source operand to either arrive from memory or to be written back to architected register file 134 or to be available via forwarding buses. Flow proceeds from block 408 back to decision block 406.

At decision block 412, early flag generation/control logic 212 compares the destination tags 204 from the lower pipeline stages with the source operand tag 214 to determine whether an older instruction in the pipeline 100 generated a result that is destined for the architected register file 134 register specified by the source operand tag 214. If so, the result is present in the early register file 136, although the result may or may not be valid. If an older instruction in the pipeline 100 has not generated a result that is destined for the architected register file 134 register specified by the source operand tag 214, flow proceeds to block 416; otherwise flow proceeds to block 414.

At block 414, the early flag generation/control logic 212 generates a value on control signal 282 to cause the multiplexer 226 to select the register source operand specified by the source operand tag 214 that is provided by the early register file 136. If the early result 242 is generated in the A-stage 112 during the same clock cycle that the instruction reaches the R-stage 108 and requests the source operand, then the multiplexer 226 will select the early result 242 input to provide the source operand to the instruction. The multiplexer 226 may select multiple register operands from the early register file 136 for an instruction that specifies multiple register operands. Flow proceeds to block 418.

At block 416, the early flag generation/control logic 212 generates a value on control signal 282 to cause the multiplexer 226 to select the register source operand specified by the source operand tag 214 that is provided by the architected register file 134. Additionally, early flag generation/control logic 212 controls multiplexer 226 to select non-register operands specified by the instruction, if any, such as immediate/constant operand 222 or valid forwarded operands. Flow proceeds to block 418.

At block 418, the instruction proceeds to the A-stage 112 where the early execution logic/address generator 138 generates the early result 242 using the source operands selected by multiplexer 226. In particular, the appropriate one of the arithmetic logic 272, Boolean logic 274, or shift logic 276 generates the early result 242 depending upon the instruction type. Flow proceeds to decision block 422.

At decision block 422, early flag generation/control logic 212 examines the destination operand tag of the instruction to determine whether the early result 242 is destined for a register in the architected register file 134. If so, flow proceeds to decision block 424; otherwise, flow proceeds to decision block 434.

At decision block 424, early flag generation/control logic 212 examines the instruction type to determine whether the instruction is a type that is executable by, the early execution logic/address generator 138. That is, the early flag generation/control logic 212 determines whether the instruction is within the subset of instructions for which the early execution logic/address generator 138 is configured to generate a correct early result, assuming the source operands are valid. If so, flow proceeds to decision block 428; otherwise, flow proceeds to block 426.

At block 426, the early flag generation/control logic 212 generates a false value on early result valid signal 244 and updates the valid bit 218 corresponding to the early register file 136 register specified by the destination operand tag 216 with the false value since the early execution logic/address generator 138 was not configured to generate a valid early result 242 for the instruction type. Flow proceeds to decision block 434.

At decision block 428, since the early execution logic/address generator 138 was configured to generate a correct early result 242, the early flag generation/control logic 212 determines whether all of the operands used to generate the early result 242 were valid. It is noted that if the early flag generation/control logic 212 determines at decision block 404 that the instruction must not be executed in the A-stage 112, then the instruction is not stalled at the R-stage 108 for lack of an operand. That is, even if a register operand from the early register file 136 is not valid, the instruction is not stalled at the R-stage 108. Similarly, if a memory operand has not yet been loaded from memory, the instruction is not stalled at the R-stage 108. Similarly, if the early execution logic/address generator 138 is not configured to generate a valid early request for the instruction type, the instruction is not stalled at the R-stage 108. Instead, the early result 242 is marked invalid at block 426, and the correct result is computed later by the E-stage 124 execution units 146. In contrast, instructions that must be executed in the A-stage 112, such as an instruction that computes an address used to access the data cache in the D-stage 116, are stalled in the R-stage 108 if the operands are not yet available and/or are not valid. If all of the operands used to generate the early result 242 were valid, flow proceeds to block 432; otherwise, flow proceeds to block 426.

At block 432, early flag generation/control logic 212 generates a true value on early result valid signal 244 and updates the valid bit 218 corresponding to the early register file 136 register specified by the destination operand tag 216 with the true value since a valid early result 242 was generated at block 418. Additionally, the early register file 136 register specified by the destination operand tag 216 is updated with the valid early result 242. Flow proceeds to decision block 434.

At decision block 434, early flag generation/control logic 212 examines the instruction to determine whether the instruction is a type that modifies the architected EFLAGS register 162. In one embodiment, instructions that modify the EFLAGS are specified according to the x86 architecture instruction set. If the instruction modifies EFLAGS, flow proceeds to block 436; otherwise, flow ends.

At block 436, early flag generation/control logic 212 generates the early EFLAGS value 262 based on the early result 242 generated by early execution logic/address generator 138 and based on the instruction 206, and updates the early EFLAGS register 142 with the early EFLAGS value 262. In one embodiment, early flag generation/control logic 212 generates a true value for the overflow flag (OF) if the signed integer two's complement arithmetic performed by early execution logic/address generator 138 to generate the early result 242 caused an overflow condition (i.e., the early result 242 is too large or too small to fit in the destination operand), and generates a false value otherwise; early flag generation/control logic 212 sets the sign flag (SF) to the value of the most significant bit of early result 242; early flag generation/control logic 212 generates a true value for the zero flag (ZF) if early result 242 is zero, and otherwise generates a false value; early flag generation/control logic 212 generates a true value for parity flag (PF) if the least-significant byte of the early result 242 contains an even number of 1 bits, and generates a false value otherwise; early flag generation/control logic 212 generates a true value for carry flag (CF) if the unsigned integer arithmetic performed by early execution logic/address generator 138 to generate the early result 242 caused an overflow condition (i.e., the arithmetic operation generated a carry or a borrow out of the most-significant bit of the early result 242), and generates a false value otherwise. In one embodiment, rather than generating an entire set of status flags for writing to the early EFLAGS register 142, the early flag generation/control logic 212 only updates the particular status flags affected by the early result 242. In either embodiment, the early flag generation/control logic 212 accumulates the status flags of preceding instructions until they are copied from the architected EFLAGS register 162, as described below with respect to FIG. 5. Flow proceeds to decision block 438.

At decision block 438, early flag generation/control logic 212 determines whether the modification of the EFLAGS depends upon the result of the instruction. For example, in one embodiment, certain instructions directly modify the EFLAGS, such as the x86 architecture STC (set carry), CLC (clear carry), or CMC (complement carry) instructions, and the modification does not depend upon the instruction result since there is no instruction result other than the modification of the status flag. If the modification of the EFLAGS depends upon the result of the instruction, then flow proceeds to decision block 442; otherwise, flow ends.

At decision block 442, early flag generation/control logic 212 examines the early result valid indicator 244 to determine whether the early result 242 is valid. If so, flow ends; otherwise, flow proceeds to block 444.

At block 444, early flag generation/control logic 212 generates a value on control signal 264 to update the value in the early EFLAGS valid register 246 to indicate the status flags stored in the early EFLAGS register 142 are invalid. It is noted that blocks 434 to 444 operate to accumulate the invalidity of the early EFLAGS register 142 once invalidated until the early EFLAGS 142 are revalidated as described below with respect to FIG. 5. In one embodiment, because instructions that modify the EFLAGS directly are relatively rarely executed, to simplify the early flag generation/control logic 212, the early EFLAGS 142 are invalidated if an instruction that directly updates a status flag is encountered. Flow ends at block 444.

Figure 5:
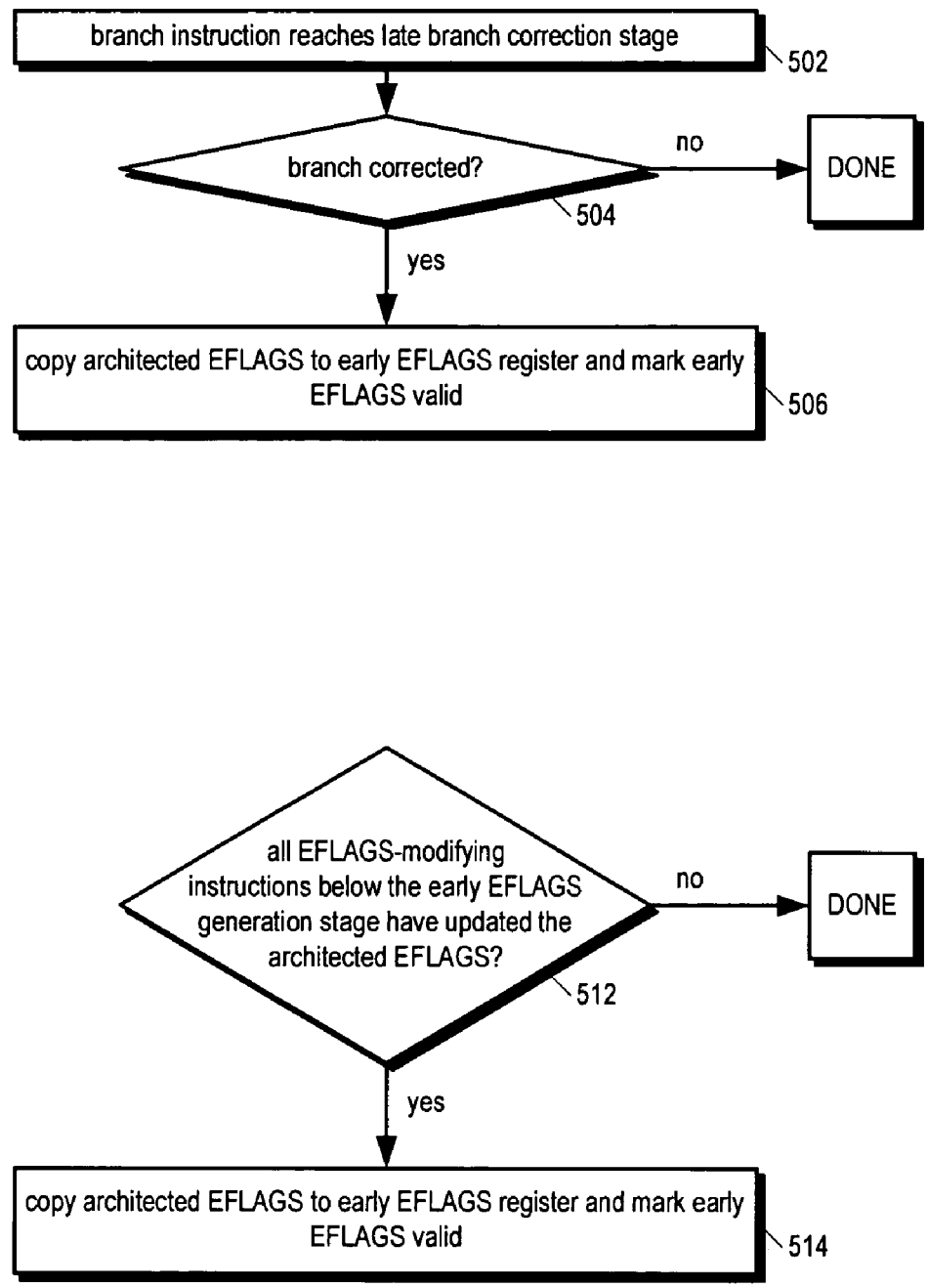
FIG. 5 is a flowchart illustrating operation of the apparatus of FIG. 2 to restore and validate the early EFLAGS register according to the present invention.

Referring now to FIG. 5, a flowchart illustrating operation of the apparatus of FIG. 2 to restore and validate the early EFLAGS register 142 according to the present invention is shown. FIG. 5 includes two separate flowcharts. Each flowchart describes restoration and validation of the early EFLAGS register 142 in response to a different event that triggers the restoration and validation. With respect to the first event, flow begins at block 502.

At block 502, a branch instruction reaches the S-stage 126. If the branch instruction needs correcting, i.e., if the branch predictor 132 mispredicted the branch instruction, either by mispredicting whether the branch was taken or mispredicting the branch target address, then the late branch correction logic 148 flushes the pipeline 100 in the process of correcting the misprediction, as described below with respect to FIG. 7. Flushing the pipeline 100 implies that no architected EFLAGS register-modifying instructions are present in the pipeline stages below the R-stage 108, or stated alternatively, any instructions in the pipeline that modify the architected EFLAGS register 162 have already updated the architected EFLAGS register 162 or have been flushed. Therefore, the architected EFLAGS register 162 contains the most current state. It is noted that the branch instruction corrected may be either a conditional or unconditional type branch instructions. Furthermore, the early EFLAGS register 142 may be restored in response to other events that cause the pipeline to be flushed other than correction of branch instructions, such as exceptions. Flow proceeds to decision block 504.

At decision block 504, early flag generation/control logic 212 examines the branch corrected late signal 268 to determine whether the S-stage 126 branch instruction was corrected by the late branch correction logic 148, thereby implying that the pipeline 100 was flushed to make the correction for the misprediction. If so, flow proceeds to block 506; otherwise, flow ends.

At block 506, the early flag generation/control logic 212 copies the value of the architected EFLAGS register 162 to the early EFLAGS register 142 via signal 262 and marks the early EFLAGS register 142 valid via signal 264, thereby restoring the early EFLAGS 142 to a valid state. Flow ends at block 506.

With respect to the second event described in FIG. 5, flow begins at block 512.

At block 512, the early flag generation/control logic 212 examines the flag-modifying instruction present signal 202 to determine whether all architected EFLAGS register-modifying instructions that are present below the A-stage 112, if any, have updated the architected EFLAGS register 162. If so, flow proceeds to block 514; otherwise, flow ends.

At block 514, the early flag generation/control logic 212 copies the value of the architected EFLAGS register 162 to the early EFLAGS register 142 via signal 262 and marks the early EFLAGS register 142 valid via signal 264, thereby restoring the early EFLAGS 142 to a valid state. Flow ends at block 514.

It is noted that the flushing of the pipeline 100 due to a branch correction in the S-stage 126, which is determined at block 504, is one event that creates the condition for which a determination is made at block 512.

Figure 6:
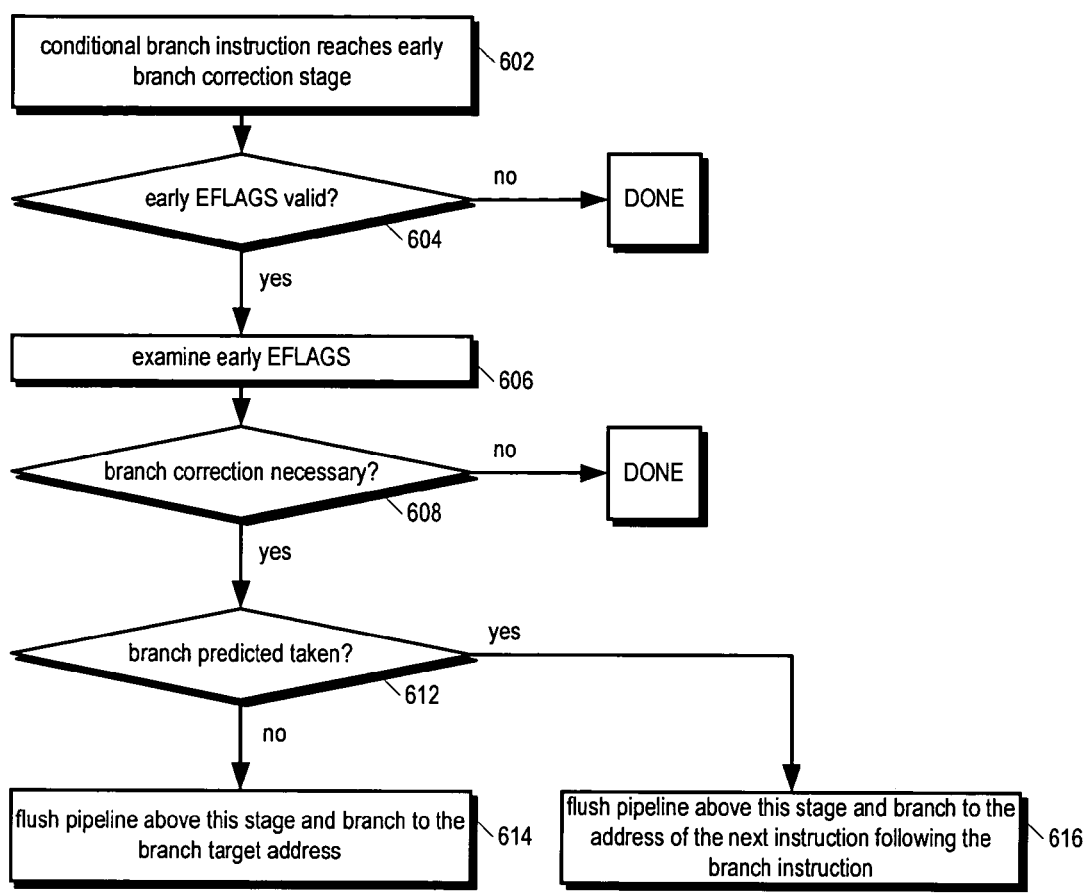
FIG. 6 is a flowchart illustrating operation of the microprocessor to perform early branch correction according to the present invention.

Referring now to FIG. 6, a flowchart illustrating operation of the microprocessor 100 to perform early branch correction according to the present invention is shown. Flow begins at block 602.

At block 602, a conditional branch instruction reaches the J-stage 114. Flow proceeds to decision block 604.

At decision block 604, early branch correction logic 144 examines the output of the early EFLAGS valid register 246 to determine whether the early EFLAGS register 142 is valid. If so, flow proceeds to block 606; otherwise, flow ends. That is, if the early EFLAGS register 142 is invalid, the apparatus does not perform early conditional branch correction.

At block 606, the early branch correction logic 144 examines the early EFLAGS register 142 contents to determine whether the condition specified by the condition code in the conditional branch instruction is satisfied. Flow proceeds to decision block 608.

At decision block 608, early branch correction logic 144 determines whether it is necessary to correct the prediction of the conditional branch instruction in response to block 606. The conditional branch instruction needs to be corrected if the condition is satisfied in the valid early EFLAGS register 142 such that the conditional branch instruction should have been taken, yet the branch predictor 132 predicted the branch not taken (as indicated by a false value on the piped-down J-stage 114 version of the branch predicted taken signal 208), i.e., caused the microprocessor 100 to fetch the next sequential instruction; conversely, the conditional branch instruction needs to be corrected if the condition is not satisfied in the valid early EFLAGS register 142 such that the conditional branch instruction should not have been taken, yet the branch predictor 132 predicted the branch taken (as indicated by a true value on the piped-down J-stage 114 version of the branch predicted taken signal 208), i.e., caused the microprocessor 100 to branch to the predicted branch target address. If it is necessary to correct the prediction of the conditional branch instruction, flow proceeds to decision block 612; otherwise, flow ends.

At decision block 612, having determined that the conditional branch instruction needs correcting, the early branch correction logic 144 examines the piped-down J-stage 114 version of the branch predicted taken signal 208 to determine whether the conditional branch instruction was predicted taken. If so, flow proceeds to block 616; otherwise, flow proceeds to block 614.

At block 614, early branch correction logic 144 directs the I-stage 102 via signal 154 to flush the pipeline 100 above the J-stage 114 and to branch the microprocessor 100 to the branch target address of the conditional branch instruction. In one embodiment, the branch target address of the conditional branch instruction is generated by the early execution logic/address generator 138 in the A-stage 112. Additionally, the early branch correction logic 144 generates a true value on branch corrected early signal 258, which is piped down to the late branch correction logic 148, whose use is described with respect to FIG. 7. Flow ends at block 614.

At block 616, early branch correction logic 144 directs the I-stage 102 via signal 154 to flush the pipeline 100 above the J-stage 114 and to branch the microprocessor 100 to the next sequential instruction after the conditional branch instruction. Additionally, the early branch correction logic 144 generates a true value on branch corrected early signal 258, which is piped down to the late branch correction logic 148, whose use is described with respect to FIG. 7. Flow ends at block 616.

Figure 7:
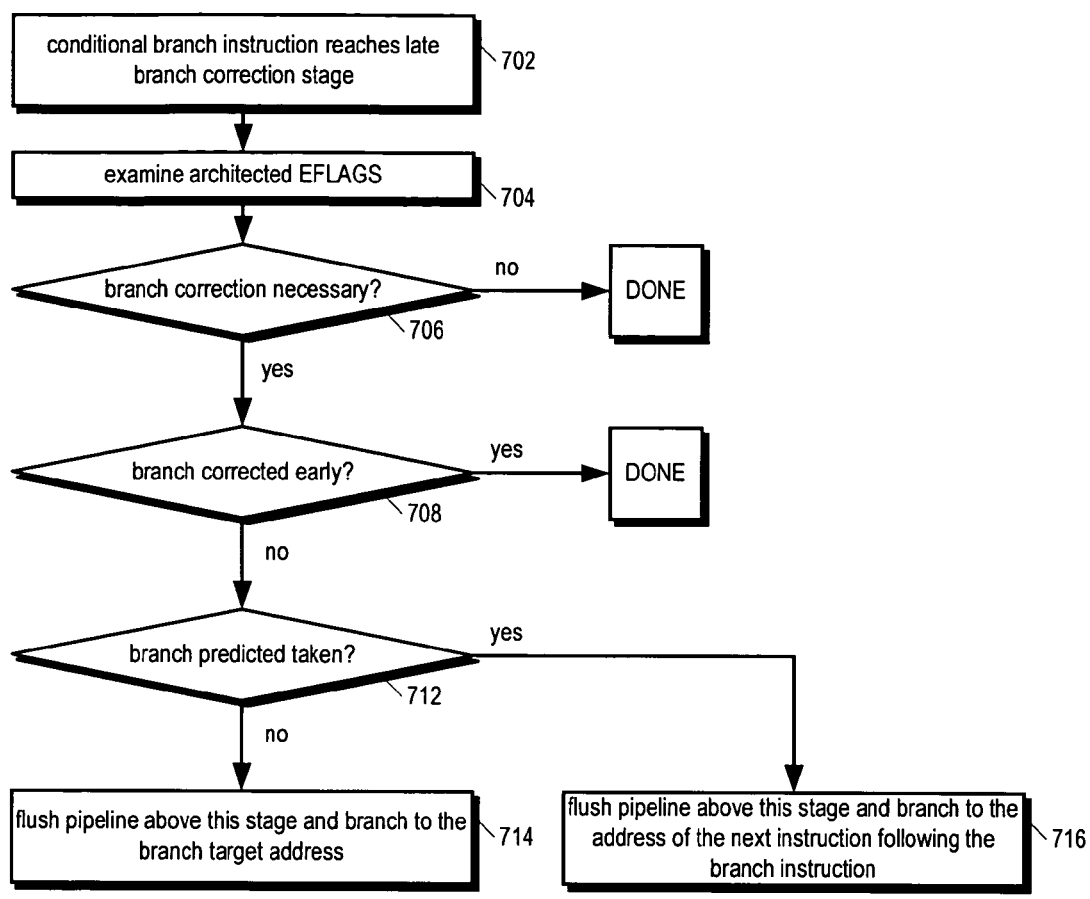
FIG. 7 is a flowchart illustrating operation of the microprocessor to perform late branch correction according to the present invention.

Referring now to FIG. 7, a flowchart illustrating operation of the microprocessor 100 to perform late branch correction according to the present invention is shown. Flow begins at block 702.

At block 702, a conditional branch instruction reaches the S-stage 126. Flow proceeds to block 704.

At block 704, the late branch correction logic 148 examines the architected EFLAGS register 162 contents to determine whether the condition specified by the condition code in the conditional branch instruction is satisfied. Flow proceeds to decision block 706.

At decision block 706, late branch correction logic 148 determines whether it is necessary to correct the prediction of the conditional branch instruction in response to block 704. The conditional branch instruction needs to be corrected if the condition is satisfied in the architected EFLAGS register 162 such that the conditional branch instruction should have been taken, yet the branch predictor 132 predicted the branch not taken (as indicated by a false value on the piped-down S-stage 126 version of the branch predicted taken signal 208), i.e., caused the microprocessor 100 to fetch the next sequential instruction; conversely, the conditional branch instruction needs to be corrected if the condition is not satisfied in the architected EFLAGS register 162 such that the conditional branch instruction should not have been taken, yet the branch predictor 132 predicted the branch taken (as indicated by a true value on the piped-down S-stage 126 version of the branch predicted taken signal 208), i.e., caused the microprocessor 100 to branch to the predicted branch target address. If it is necessary to correct the prediction of the conditional branch instruction, flow proceeds to decision block 708; otherwise, flow ends.

At decision block 708, late branch correction logic 148 examines the branch corrected early signal 258 to determine whether the misprediction of the conditional branch instruction was already corrected by the early branch correction logic 144. If so, flow ends; otherwise, flow proceeds to decision block 712.

At decision block 712, having determined that the conditional branch instruction needs correcting, the late branch correction logic 148 examines the piped-down S-stage 126 version of the branch predicted taken signal 208 to determine whether the conditional branch instruction was predicted taken. If so, flow proceeds to block 716; otherwise, flow proceeds to block 714.

At block 714, late branch correction logic 148 directs the I-stage 102 via signal 154 to flush the pipeline 100 above the S-stage 126 and to branch the microprocessor 100 to the branch target address of the conditional branch instruction. Flow ends at block 714.

At block 716, late branch correction logic 148 directs the I-stage 102 via signal 154 to flush the pipeline 100 above the S-stage 126 and to branch the microprocessor 100 to the next sequential instruction after the conditional branch instruction. Flow ends at block 716.

As may be seen from the foregoing, the microprocessor 100 described is capable of providing a result of a preceding instruction as a register operand to a subsequent address-generating or non-address-generating instruction multiple clock cycles earlier than a microprocessor without the benefit of the early execution logic/address generator 138 and early register file 136, thereby reducing the number of pipeline bubbles incurred. Reducing pipeline bubbles decreases the average clocks per instruction, which is a major component of microprocessor performance. Furthermore, the early results may be employed to update status flags sooner than was previously possible, thereby potentially enabling the execution of conditional instructions sooner than was previously possible. Still further, the microprocessor 100 described is capable of correcting an incorrectly predicted conditional branch instruction multiple clock cycles sooner than a microprocessor without the benefit of the early branch correction logic 144. Finally, the demand for higher microprocessor clock frequencies is causing microprocessor designers to increase the number of pipeline stages. As the number of pipelines stages increases, the number of pipeline bubbles incurred waiting for instruction results and/or status flag updates may increase. Similarly, the delay in correcting mispredicted branch instructions may also increase as the number of pipeline stages increases. These facts heighten the advantages just described of the microprocessor, apparatus, and method described herein.

Although the present invention and its objects, features and advantages have been described in detail, other embodiments are encompassed by the invention. For example, although a microprocessor embodiment is described substantially conforming to the x86 architecture, the apparatus and method described are not limited to the x86 architecture and may be employed in various microprocessor architectures. Additionally, although an embodiment is described in which a conditional branch instruction is corrected early, advantages of the early generation of status flags may be utilized to perform other instructions early, such as, for example the x86 LOOPcc instruction, for which the same benefits inhere as with the Jcc instruction; or the x86 SETcc and CMOVcc instructions may be executed early so that their results may be available for subsequent dependent instructions. Furthermore, beyond usage of the early results to generate early status flag values, the early results may also be used to perform early branch correction of indirect branch instructions, commonly referred to as "jump through register" instructions, which specify the branch target address as a source register operand value.

Also, in addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus for generating early status flags to enable early execution of a conditional instruction in a pipeline microprocessor having architected status flags, the apparatus comprising:
a storage element, for accumulating early status flags corresponding to the architected status flags; and
logic, coupled to said storage element, configured to update said early status flags in said storage element in response to early results of instructions preceding the conditional instruction, wherein said logic invalidates said early status flags if at least one of said early results of said instructions that modify said early status flags is invalid, thereby enabling, if said early status flags are valid, execution of the conditional instruction based on said early status flags prior to the microprocessor updating the architected status flags in response to final results generated for said preceding instructions, wherein said logic is further configured to copy said architected status flags to said early status flags and validate said early status flags if the microprocessor pipeline is flushed.

2. The apparatus of claim 1, further comprising:
a first stage of the microprocessor pipeline, wherein said logic generates said early status flags;
a second stage of the microprocessor pipeline, for updating the architected status flags;
wherein said first stage is earlier in the microprocessor pipeline than said second stage.

3. The apparatus of claim 1, wherein said early status flags comprise one or more x86 architecture EFLAGS register status flags.

4. The apparatus of claim 1, wherein said early results comprise results of instructions comprising a subset of the instruction set supported by the microprocessor.

5. The apparatus of claim 4, wherein said subset of instructions comprises instructions for performing simple arithmetic operations.

6. The apparatus of claim 4, wherein said subset of instructions comprises instructions for performing simple shift operations.

7. The apparatus of claim 4, wherein said subset of instructions comprises instructions for performing simple Boolean operations.

8. The apparatus of claim 4, wherein said subset of instructions comprises instructions used for updating the architected status flags for use as condition codes specified by conditional branch instructions.

9. The apparatus of claim 4, wherein said early results are generated prior to execution of the instructions by execution units of the microprocessor that generate final results of the instructions.

10. The apparatus of claim 1, further comprising:
early execution logic, coupled to said logic, for generating said early results of said preceding instructions.

11. The apparatus of claim 10, wherein said early results that modify said early status flags are valid if said instruction specifies an operation that said early execution logic is configured to perform and all input operands to said early execution logic used to generate said early results are valid.

12. The apparatus of claim 10, wherein said early execution logic is within an address generation stage of the pipeline microprocessor.

13. The apparatus of claim 10, wherein said early execution logic generates said early results in response to source operands received from is an architected register file of the microprocessor.

14. The apparatus of claim 10, further comprising:
an early register file, coupled to said early execution logic, having a plurality of registers corresponding to registers of an architected register file of the microprocessor, wherein said plurality of registers of said early register file are selectively valid.

15. The apparatus of claim 14, wherein if one of said plurality of registers provides an input operand to said early execution logic to generate said early results of at least one of said instructions that modify said early status flags and said input operand is invalid, said logic invalidates said early status flags.

16. The apparatus of claim 10, wherein said early execution logic is configured to execute a subset of instructions executable by the microprocessor, wherein if at least one of said instructions that modify said early status flags is not in said subset, said logic invalidates said early status flags.

17. The apparatus of claim 1, wherein the pipeline microprocessor is a scalar microprocessor.

18. The apparatus of claim 1, wherein the pipeline microprocessor issues instructions in program order.

19. The apparatus of claim 1, wherein said storage element is not specifiable by program instructions.

20. A pipeline microprocessor having non-selectively valid architected status flags, and including in its instruction set conditional instructions that specify a condition and an operation, wherein if the condition is satisfied the microprocessor performs the operation, comprising:
early status flags corresponding to the status flags stored in the architected register, wherein said early status flags are selectively valid;
conditional execution logic, coupled to receive said early status flags, for performing an operation specified by a conditional instruction if said early status flags are valid, and if a condition specified by said conditional instruction is satisfied in said early status flags; and
control logic, coupled to said early status flags, configured to copy said architected status flags to said early status flags and validate said early status flags if the microprocessor pipeline is flushed.

21. The microprocessor of claim 20, further comprising:
final execution logic, coupled to receive the architected status flags, for performing said operation if said condition is satisfied in the architected status flags and said operation is not performed by said conditional execution logic.

22. The microprocessor of claim 20, further comprising:
logic, for generating said early status flags in response to an instruction preceding said conditional instruction, wherein said preceding instruction specifies modification of the architected status flags.

23. The microprocessor of claim 22, further comprising:
an early register file, operatively coupled to said logic, having a plurality of registers corresponding to registers of an architected register file of the microprocessor, wherein said plurality of registers of said early register file are selectively valid.

24. The microprocessor of claim 23, wherein said preceding instruction specifies at least one input operand from said architected register file, wherein said logic generates said early status flags in response to a result of said preceding instruction that is generated based on said at least one input operand provided by said early register file rather than by said architected register file.

25. The microprocessor of claim 24, wherein if said at least one operand provided by said early register file is invalid, said early status flags are invalid.

26. The microprocessor of claim 22, wherein if at least one input operand provided to said preceding instruction is invalid, said early status flags are invalid.

27. The microprocessor of claim 22, further comprising:
early execution logic, coupled to said logic, configured to execute a subset of instructions executable by the microprocessor, wherein if said preceding instruction is not in said subset, said early status flags are invalid.

28. The microprocessor of claim 20, wherein the microprocessor is a scalar microprocessor.

29. The microprocessor of claim 20, wherein the microprocessor issues instructions in program order.

30. The microprocessor of claim 20, wherein said conditional execution logic is within an address generation stage of the pipeline microprocessor.

31. A method for generating status flags early in a pipeline microprocessor to enable early execution of an instruction that conditionally performs an operation based on a condition of the status flags specified by the instruction, the method comprising:
generating a first instance of the status flags in response to an instruction preceding the conditional instruction wherein the first instance may not be valid;
generating a second instance of the status flags in response to the preceding instruction, subsequent to said generating the first instance, wherein the second instance is always valid;
performing the operation, prior to said generating the second instance, if the condition is satisfied in the first instance of the status flags and if the first instance is valid;
determining whether the microprocessor pipeline is flushed; and
copying architected status flags to the first instance of the status flags and validating the first instance of the status flags if the microprocessor pipeline is flushed.

32. The method of claim 31, further comprising:
updating an architected register for storing the status flags after said generating said second instance.

33. The method of claim 31, further comprising:
generating a result of the preceding instruction, prior to said generating the first instance;
determining whether the result of the preceding instruction is valid; and
invalidating the first instance if the result is invalid.

34. The method of claim 33, wherein said determining whether the result of the preceding instruction is valid comprises:
determining whether the result of the preceding instruction is generated using valid input operands; and
indicating the result is invalid if the input operands are invalid.

35. The method of claim 33, wherein said determining whether the result of the preceding instruction is valid comprises:
determining whether the preceding instruction is an instruction that is performable by early execution logic of the microprocessor; and
indicating the result is invalid if the preceding instruction is not an instruction that is performable by the early execution logic.

36. The method of claim 35, wherein the early execution logic generates the result prior to generation of an always valid instance of the result by an execution unit of the microprocessor.

37. The method of claim 33, further comprising:
determining whether the preceding instruction modifies the status flags; and
said invalidating the first instance only if the preceding instruction modifies the status flags.

38. The method of claim 31, wherein said generating the first instance is performed without stalling the microprocessor pipeline regardless of whether input operands to the preceding instruction are valid.

39. The method of claim 31, further comprising:
determining whether all status flag-modifying instructions present in the microprocessor pipeline below a stage in which said generating the first instance is performed, if any, have updated architected status flags of the microprocessor; and
copying architected status flags to the first instance of the status flags and marking the first instance of the status flags valid if all status flags-modifying instructions present in the microprocessor pipeline below a stage in which said generating the first instance is performed, if any, have updated architected status flags of the microprocessor.

40. A computer program embodied on a computer-readable medium, comprising:
computer-readable program code for providing an apparatus for generating early status flags to enable early execution of a conditional instruction in a pipeline microprocessor having architected status flags, said program code comprising:
first program code for providing a storage element, for accumulating early status flags corresponding to the architected status flags; and
second program code for providing logic, coupled to said storage element, configured to update said early status flags in said storage element in response to early results of instructions preceding the conditional instruction, wherein said logic invalidates said early status flags if at least one of said early results of said instructions that modify said early status flags is invalid, thereby enabling, if said early status flags are valid, execution of the conditional instruction based on said early status flags prior to the microprocessor updating the architected status flags in response to final results generated for said preceding instructions, wherein said logic is further configured to copy said architected status flags to said early status flags and validate said early status flags if the microprocessor pipeline is flushed.

41. An apparatus for generating early status flags to enable early execution of a conditional instruction in a pipeline microprocessor having architected status flags, the apparatus comprising:
a storage element, for accumulating early status flags corresponding to the architected status flags; and
logic, coupled to said storage element, configured to update said early status flags in said storage element in response to early results of instructions preceding the conditional instruction, wherein said logic invalidates said early status flags if at least one of said early results of said instructions that modify said early status flags is invalid, thereby enabling, if said early status flags are valid, execution of the conditional instruction based on said early status flags prior to the microprocessor updating the architected status flags in response to final results generated for said preceding instructions, wherein said logic is further configured to copy said architected status flags to said early status flags and validate said early status flags if all status flag-modifying instructions present in the microprocessor pipeline below a stage in which said early status flags are generated, if any, have updated architected status flags of the microprocessor.

42. The apparatus of claim 41, further comprising:
a first stage of the microprocessor pipeline, wherein said logic generates said early status flags;
a second stage of the microprocessor pipeline, for updating the architected status flags;
wherein said first stage is earlier in the microprocessor pipeline than said second stage.

43. The apparatus of claim 41, wherein said early status flags comprise one or more x86 architecture EFLAGS register status flags.

44. The apparatus of claim 41, wherein said early results comprise results of instructions comprising a subset of the instruction set supported by the microprocessor.

45. The apparatus of claim 44, wherein said subset of instructions comprises instructions for performing simple arithmetic operations.

46. The apparatus of claim 44, wherein said subset of instructions comprises instructions for performing simple shift operations.

47. The apparatus of claim 44, wherein said subset of instructions comprises instructions for performing simple Boolean operations.

48. The apparatus of claim 44, wherein said subset of instructions comprises instructions used for updating the architected status flags for use as condition codes specified by conditional branch instructions.

49. The apparatus of claim 44, wherein said early results are generated prior to execution of the instructions by execution units of the microprocessor that generate final results of the instructions.

50. The apparatus of claim 41, further comprising:
early execution logic, coupled to said logic, for generating said early results of said preceding instructions.

51. The apparatus of claim 50, wherein said early results that modify said early status flags are valid if said instruction specifies an operation that said early execution logic is configured to perform and all input operands to said early execution logic used to generate said early results are valid.

52. The apparatus of claim 50, wherein said early execution logic is within an address generation stage of the pipeline microprocessor.

53. The apparatus of claim 50, wherein said early execution logic generates said early results in response to source operands received from an architected register file of the microprocessor.

54. The apparatus of claim 50, further comprising:
an early register file, coupled to said early execution logic, having a plurality of registers corresponding to registers of an architected register file of the microprocessor, wherein said plurality of registers of said early register file are selectively valid.

55. The apparatus of claim 54, wherein if one of said plurality of registers provides an input operand to said early execution logic to generate said early results of at least one of said instructions that modify said early status flags and said input operand is invalid, said logic invalidates said early status flags.

56. The apparatus of claim 50, wherein said early execution logic is configured to execute a subset of instructions executable by the microprocessor, wherein if at least one of said instructions that modify said early status flags is not in said subset, said logic invalidates said early status flags.

57. The apparatus of claim 41, wherein the pipeline microprocessor is a scalar microprocessor.

58. The apparatus of claim 41, wherein the pipeline microprocessor issues instructions in program order.

59. The apparatus of claim 41, wherein said storage element is not specifiable by program instructions.

60. A pipeline microprocessor having non-selectively valid architected status flags, and including in its instruction set conditional instructions that specify a condition and an operation, wherein if the condition is satisfied the microprocessor performs the operation, comprising:
early status flags corresponding to the status flags stored in the architected register, wherein said early status flags are selectively valid;
conditional execution logic, coupled to receive said early status flags, for performing an operation specified by a conditional instruction if said early status flags are valid, and if a condition specified by said conditional instruction is satisfied in said early status flags; and
control logic, coupled to said early status flags, configured to copy said architected status flags to said early status flags and validate said early status flags if all status flag-modifying instructions present in the microprocessor pipeline below a stage in which said early status flags are generated, if any, have updated architected status flags of the microprocessor.

61. The microprocessor of claim 60, further comprising:
final execution logic, coupled to receive the architected status flags, for performing said operation if said condition is satisfied in the architected status flags and said operation is not performed by said conditional execution logic.

62. The microprocessor of claim 60, further comprising:
logic, for generating said early status flags in response to an instruction preceding said conditional instruction, wherein said preceding instruction specifies modification of the architected status flags.

63. The microprocessor of claim 62, further comprising:
an early register file, operatively coupled to said logic, having a plurality of registers corresponding to registers of an architected register file of the microprocessor, wherein said plurality of registers of said early register file are selectively valid.

64. The microprocessor of claim 63, wherein said preceding instruction specifies at least one input operand from said architected register file, wherein said logic generates said early status flags in response to a result of said preceding instruction that is generated based on said at least one input operand provided by said early register file rather than by said architected register file.

65. The microprocessor of claim 64, wherein if said at least one operand provided by said early register file is invalid, said early status flags are invalid.

66. The microprocessor of claim 62, wherein if at least one input operand provided to said preceding instruction is invalid, said early status flags are invalid.

67. The microprocessor of claim 62, further comprising:
early execution logic, coupled to said logic, configured to execute a subset of instructions executable by the microprocessor, wherein if said preceding instruction is not in said subset, said early status flags are invalid.

68. The microprocessor of claim 60, wherein the microprocessor is a scalar microprocessor.

69. The microprocessor of claim 60, wherein the microprocessor issues instructions in program order.

70. The microprocessor of claim 60, wherein said conditional execution logic is within an address generation stage of the pipeline microprocessor.

71. A method for generating status flags early in a pipeline microprocessor to enable early execution of an instruction that conditionally performs an operation based on a condition of the status flags specified by the instruction, the method comprising:
generating a first instance of the status flags in response to an instruction preceding the conditional instruction wherein the first instance may not be valid;
generating a second instance of the status flags in response to the preceding instruction, subsequent to said generating the first instance, wherein the second instance is always valid;
performing the operation, prior to said generating the second instance, if the condition is satisfied in the first instance of the status flags and if the first instance is valid;
determining whether all status flag-modifying instructions present in the microprocessor pipeline below a stage in which said generating the first instance is performed, if any, have updated architected status flags of the microprocessor; and
copying architected status flags to the first instance of the status flags and marking the first instance of the status flags valid if all status flags-modifying instructions present in the microprocessor pipeline below a stage in which said generating the first instance is performed, if any, have updated architected status flags of the microprocessor.

72. The method of claim 71, further comprising:
updating an architected register for storing the status flags after said generating said second instance.

73. The method of claim 71, further comprising:
generating a result of the preceding instruction, prior to said generating the first instance;
determining whether the result of the preceding instruction is valid; and
invalidating the first instance if the result is invalid.

74. The method of claim 73, wherein said determining whether the result of the preceding instruction is valid comprises:
determining whether the result of the preceding instruction is generated using valid input operands; and
indicating the result is invalid if the input operands are invalid.

75. The method of claim 73, wherein said determining whether the result of the preceding instruction is valid comprises:
determining whether the preceding instruction is an instruction that is performable by early execution logic of the microprocessor; and
indicating the result is invalid if the preceding instruction is not an instruction that is performable by the early execution logic.

76. The method of claim 75, wherein the early execution logic generates the result prior to generation of an always valid instance of the result by an execution unit of the microprocessor.

77. The method of claim 73, farther comprising:
determining whether the preceding instruction modifies the status flags; and
said invalidating the first instance only if the preceding instruction modifies the status flags.

78. The method of claim 71, wherein said generating the first instance is performed without stalling the microprocessor pipeline regardless of whether input operands to the preceding instruction are valid.

79. The method of claim 71, further comprising:
determining whether the microprocessor pipeline is flushed; and
copying architected status flags to the first instance of the status flags and validating the first instance of the status flags if the microprocessor pipeline is flushed.

80. A computer program embodied on a computer-readable medium, comprising:
computer-readable program code for providing an apparatus for generating early status flags to enable early execution of a conditional instruction in a pipeline microprocessor having architected status flags, said program code comprising:
first program code for providing a storage element, for accumulating early status flags corresponding to the architected status flags; and
second program code for providing logic, coupled to said storage element, configured to update said early status flags in said storage element in response to early results of instructions preceding the conditional instruction, wherein said logic invalidates said early status flags if at least one of said early results of said instructions that modify said early status flags is invalid, thereby enabling, if said early status flags are valid, execution of the conditional instruction based on said early status flags prior to the microprocessor updating the architected status flags in response to final results generated for said preceding instructions, wherein said logic is further configured to copy said architected status flags to said early status flags and validate said early status flags if all status flag-modifying instructions present in the microprocessor pipeline below a stage in which said early status flags are generated, if any, have updated architected status flags of the microprocessor.

* * * * *